UNITED STATES PATENT OFFICE.

HUGO GALLINOWSKY, OF SAN FRANCISCO, CALIFORNIA, ASSIGNOR OF ONE-HALF TO CHARLES M. YATES, OF SAME PLACE.

SHIP'S PAINT.

SPECIFICATION forming part of Letters Patent No. 504,211, dated August 29, 1893.

Application filed March 30, 1893. Serial No. 468,339. (No specimens.)

*To all whom it may concern:*

Be it known that I, HUGO GALLINOWSKY, a citizen of the United States, residing in the city and county of San Francisco, State of California, have invented an Improvement in Ships' Paints; and I hereby declare the following to be a full, clear, and exact description of the same.

My invention relates to a paint which is especially suitable for ships' bottoms, and for woodwork which is submerged in sea water and subject to the attacks of marine insects, and also as a wood preservative.

It consists of a combination of hydromagnesite, quicksilver chloride, magnesium chloride, or zinc, or calcium chloride.

In making my compound I take a proportion of one and one-half pounds of hydromagnesite, finely pulverized, one-fourth pound of quicksilver chloride, three-fourths pound of magnesium chloride, or zinc or calcium chloride. This is intimately mixed and made sufficiently thin for application, with water, or, if desired, with oil or other vehicle for the preparation of paints. With this may be mixed any of the metallic oxides as coloring matter, and the mixture, when completed, is in condition to be applied with a brush in the usual manner, forming a smooth and efficient protective covering. The chlorides mentioned, and others of a like nature are more or less soluble when used alone, but when mixed with the hydromagnesite in the manner stated they lose this quality and unite to form a cement which sets and becomes very hard in a short time. The quicksilver chloride does not lose its poisonous quality by reason of its bond with the hydromagnesite, and therefore, it is exceedingly useful in the destruction of insect life.

Having thus described my invention, what I claim as new, and desire to secure by Letters Patent, is—

A paint compound consisting of hydromagnesite, quicksilver chloride, and magnesium chloride and metallic oxide, substantially as herein described.

In witness whereof I have hereunto set my hand.

HUGO GALLINOWSKY.

Witnesses:
S. H. NOURSE,
GEO. H. STRONG.